(12) United States Patent
Koesters et al.

(10) Patent No.: US 10,341,647 B2
(45) Date of Patent: Jul. 2, 2019

(54) METHOD FOR CALIBRATING A CAMERA AND CALIBRATION SYSTEM

(71) Applicant: Robert Bosch GmbH, Stuttgart (DE)

(72) Inventors: Damian Koesters, Pfungstadt (DE); Gregor Blott, Salzgitter (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/829,130

(22) Filed: Dec. 1, 2017

(65) Prior Publication Data

US 2018/0160110 A1  Jun. 7, 2018

(30) Foreign Application Priority Data

Dec. 5, 2016 (DE) ........................ 10 2016 224 095

(51) Int. Cl.
| | |
|---|---|
| *H04N 17/00* | (2006.01) |
| *G06T 7/80* | (2017.01) |
| *G06T 7/20* | (2017.01) |
| *G06T 7/30* | (2017.01) |
| *G06T 5/00* | (2006.01) |
| *G06T 5/40* | (2006.01) |
| *H04N 1/387* | (2006.01) |
| *H04N 1/60* | (2006.01) |
| *H04N 5/232* | (2006.01) |
| *H04N 5/217* | (2011.01) |

(52) U.S. Cl.
CPC ......... *H04N 17/002* (2013.01); *G06T 5/008* (2013.01); *G06T 5/40* (2013.01); *G06T 7/30* (2017.01); *G06T 7/80* (2017.01); *H04N 1/3876* (2013.01); *H04N 1/6027* (2013.01); *H04N 5/217* (2013.01); *H04N 5/23238* (2013.01); *G06T 2207/10016* (2013.01); *G06T 2207/30204* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 8,908,922 | B2* | 12/2014 | Marty | G06T 7/2033 |
| | | | | 382/103 |
| 9,058,670 | B2* | 6/2015 | Birenboim | G06T 7/2006 |
| 9,179,047 | B2* | 11/2015 | Dani | G01B 11/24 |
| 9,283,457 | B2* | 3/2016 | Thurman | A63B 69/002 |
| 9,516,276 | B2* | 12/2016 | Kirk | H04N 7/18 |

(Continued)

FOREIGN PATENT DOCUMENTS

| | | |
|---|---|---|
| DE | 102007001649 A1 | 7/2008 |
| WO | 2009142921 A2 | 11/2009 |

*Primary Examiner* — Brian P Yenke
(74) *Attorney, Agent, or Firm* — Norton Rose Fulbright US LLP; Gerard Messina

(57) ABSTRACT

A method for calibrating a camera. The method includes a step of reading in and a step of ascertaining, an imaging trajectory and a reference trajectory of a moving calibration object detected by using the camera being read in in the step of reading in, the imaging trajectory representing a trajectory imaged in image coordinates of the camera and the reference trajectory representing the trajectory in world coordinates, and at least one calibration parameter for the camera being ascertained in the step of ascertaining by using the imaging trajectory and the reference trajectory.

10 Claims, 2 Drawing Sheets

(56) References Cited

U.S. PATENT DOCUMENTS

| | | | |
|---|---|---|---|
| 9,656,140 B2* | 5/2017 | Thurman | A63B 69/002 |
| 9,697,617 B2* | 7/2017 | Marty | G06T 7/246 |
| 9,740,899 B1* | 8/2017 | Shah | G06K 7/10415 |
| 9,855,481 B2* | 1/2018 | Tuxen | A63B 69/36 |
| 9,857,459 B2* | 1/2018 | Tuxen | G01S 13/58 |
| 9,955,126 B2* | 4/2018 | Yeo | H04N 7/188 |
| 2003/0073518 A1* | 4/2003 | Marty | A63B 24/0021 473/416 |
| 2007/0076977 A1* | 4/2007 | Chen | G06K 9/209 382/276 |
| 2008/0219509 A1* | 9/2008 | White | A63B 24/0003 382/107 |
| 2008/0281443 A1* | 11/2008 | Rodgers | A63B 71/0605 700/91 |
| 2008/0312010 A1* | 12/2008 | Marty | A63B 24/0003 473/447 |
| 2010/0091112 A1* | 4/2010 | Veeser | G01B 11/002 348/207.1 |
| 2010/0103266 A1* | 4/2010 | Merkel | G06T 7/80 348/155 |
| 2010/0184563 A1* | 7/2010 | Molyneux | A43B 1/0054 482/1 |
| 2010/0245545 A1* | 9/2010 | Ilich-Toay | G11B 27/034 348/47 |
| 2011/0205355 A1* | 8/2011 | Liu | G06T 7/80 348/135 |
| 2011/0304497 A1* | 12/2011 | Molyneux | A43B 1/0054 342/42 |
| 2012/0206597 A1* | 8/2012 | Komoto | G06K 9/00805 348/135 |
| 2013/0095959 A1* | 4/2013 | Marty | A63B 24/0003 473/431 |
| 2013/0130843 A1* | 5/2013 | Burroughs | A63B 71/0686 473/415 |
| 2013/0163815 A1* | 6/2013 | Mai | G06T 7/20 382/103 |
| 2014/0267608 A1* | 9/2014 | Dhome | G06T 19/003 348/43 |
| 2014/0277635 A1* | 9/2014 | Thurman | A63B 24/0021 700/91 |
| 2014/0301598 A1* | 10/2014 | Marty | G06T 7/2033 382/103 |
| 2014/0301600 A1* | 10/2014 | Marty | G06T 7/246 382/103 |
| 2015/0009149 A1* | 1/2015 | Gharib | G06F 3/005 345/168 |
| 2015/0379701 A1* | 12/2015 | Borner | G01C 21/165 348/47 |
| 2016/0171909 A1* | 6/2016 | Roozeboom | G09B 23/00 434/276 |
| 2016/0180544 A1* | 6/2016 | Hohteri | G06K 9/00724 348/157 |
| 2016/0320476 A1* | 11/2016 | Johnson | G06T 7/80 |
| 2016/0361594 A1* | 12/2016 | Shibata | A63B 69/0002 |
| 2017/0124693 A1* | 5/2017 | Ramalingam | G01B 11/14 |
| 2017/0178687 A1* | 6/2017 | Tamir | H04N 5/0733 |
| 2017/0242133 A1* | 8/2017 | Yilmaz | G01S 19/26 |
| 2017/0243374 A1* | 8/2017 | Matsuzawa | G01B 11/00 |
| 2017/0333777 A1* | 11/2017 | Spivak | A63B 71/0605 |
| 2018/0180723 A1* | 6/2018 | Sebastian | G01S 17/023 |
| 2018/0272221 A1* | 9/2018 | Sundararajan | A63B 69/3658 |

* cited by examiner

METHOD FOR CALIBRATING A CAMERA AND CALIBRATION SYSTEM

CROSS REFERENCE

The present application claims the benefit under 35 U.S.C. § 119 of German Patent Application No. DE 102016224095.1 filed on Dec. 5, 2016, which is expressly incorporated herein by reference in its entirety.

FIELD

The present invention relates to a device or a method for calibrating a camera. The present invention also relates to a corresponding computer program.

BACKGROUND INFORMATION

Aberrations occur when imaging a scene in an image plane of a camera. It is possible, for example, that straight edges of objects are represented as curved in the image plane. It is possible to compensate for these aberrations in the image information by calculation using compensation parameters. In order to obtain compensation parameters, it is possible for example to map a grid made up of straight lines. The grid is mapped in the image information with the aberrations. Since the original grid is known, it is possible to calculate compensation parameters.

SUMMARY

In accordance with the present invention, a method is provided for calibrating a camera, furthermore a device that uses this method, a calibration system as well as finally a corresponding computer program. Advantageous developments and improvements of the present invention are described herein.

In accordance with the present invention, a moving object is used as reference. If a trajectory of the object is known, it is possible to infer compensation parameters via the image of the trajectory.

An example method for calibrating a camera in accordance with the present invention includes the following steps:
reading in an imaging trajectory and a reference trajectory of a moving calibration object detected by using the camera, the imaging trajectory representing a trajectory of the calibration object imaged in image coordinates of the camera, and the reference trajectory representing the trajectory in world coordinates; and
ascertaining at least one calibration parameter for the camera by using the imaging trajectory and the reference trajectory.

A camera may be understood as a video camera or a normal camera. The camera is in particular a dynamic vision camera. The dynamic vision camera images in its image information only current events within its detecting range. In the process, movements and brightness variations are imaged for example. Static elements are not imaged. A trajectory may be a travel path traveled by the calibration object. Image coordinates may refer to a sensor or an imaging plane of the camera. World coordinates may have a fixed reference to the camera. In other words, in the world coordinates, the camera may have a fixed coordinate value and a fixed orientation. The imaging trajectory and the reference trajectory may be read in via suitable interfaces, for example to the camera and to a detection device implemented separately from the camera. The imaging trajectory may represent a trajectory determined by using image data of the camera. The reference trajectory may represent a trajectory determined by using data of a detection device implemented separately from the camera. In the step of ascertaining, the calibration parameter for the camera may be ascertained by using a suitable calibration rule.

The imaging trajectory and the reference trajectory may be read in in time-synchronized fashion. The imaging trajectory and the reference trajectory may refer to the same period of time. A calculation of compensation parameters only make sense as a result of the synchronization or the time relation.

The method may include a step of detecting the reference trajectory in that at least one acceleration characteristic of the calibration object is detected, in order to obtain the reference trajectory. Accelerations may be detected by acceleration sensors on the calibration object. It is possible to calculate the trajectory from accelerations without measuring the trajectory absolutely.

In the step of detecting, it is possible to detect a position of the calibration object at a plurality of detection times in order to obtain the reference trajectory. In the step of reading in, it is possible to read in an image coordinate value of the calibration object at each one of the detection times in order to obtain the imaging trajectory. A synchronized detection in the image coordinates and world coordinates at particular times is able to reduce a data volume and accelerate the ascertainment of the calibration parameters.

It is possible to perform the step of detecting by using a detection device implemented separately from the camera. The detection device may have an acceleration sensor, for example, for detecting the reference trajectory. The imaging trajectory may be determined by using image information, for example from image data of the camera. In this manner, it is possible to detect the trajectories independently of one another.

The method may include a step of moving the calibration object along the trajectory. The calibration object may be moved along a predefined path. The prior knowledge of the path makes it possible to ascertain the reference trajectory quickly and simply.

It is possible to implement this method for example in software or hardware or in a mixed form of software and hardware in a control unit, for example.

The approach presented here furthermore creates a calibration device that is designed to perform, control and/or implement the steps of a variant of a method presented here in appropriate systems. This variant of an embodiment of the present invention in the form of a calibration device also makes it possible to achieve the objective at the basis of the present invention quickly and efficiently.

For this purpose, the calibration device may include at least one processing unit for processing signals or data, at least one storage unit for storing signals or data, at least one interface to a sensor or an actuator for reading in sensor signals from the sensor or for outputting data or control signals to the actuator and/or at least one communication interface for reading in or outputting data that are embedded in a communication protocol. The processing unit may be for example a signal processor, a microcontroller or the like, while the storage unit may be a flash memory, an EEPROM or a magnetic storage unit. The communication interface may be designed to read in or output data in wireless and/or line-conducted fashion, it being possible for a communication interface, which is able to read in or output line-conducted data, to read in these data from a corresponding data transmission line or to output these data to a corresponding data transmission line electrically or optically, for example.

In the present context, a calibration device may be understood as an electric device that processes sensor signals and as a function thereof outputs control and/or data signals. The calibration device may have an interface that may be implemented in hardware and/or software. In a hardware development, the interfaces may be part of a so-called system ASIC, for example, which comprises many different functions of the calibration device. It is also possible, however, for the interfaces to be separate, integrated circuits or to be at least partially made up of discrete components. In a software development, the interfaces may be software modules which, for example, exist on a microcontroller in addition to other software modules.

Furthermore, an example calibration system for calibrating a camera is provided, the calibration system having the following features:
a detection device for detecting a reference trajectory of a calibration object; and
a calibration device according to the approach presented here.

The detection device may be developed as the calibration object that is movable along a trajectory and is detectable by the camera. The calibration object may comprise sensors that may be used for detecting the reference trajectory. The calibration object may be a ball, for example, that may be thrown and/or rolled into the detecting range of the camera.

Also advantageous is a computer program product or a computer program having program code that may be stored on a machine-readable carrier or storage medium such as a semiconductor memory, a hard disk memory or an optical memory and that is used for performing, implementing and/or controlling the steps of the example method in accordance with one of the specific embodiments described above, in particular when the program product or program is executed on a computer or a device.

Exemplary embodiments of the approach presented here are shown in the figures and are explained in more detail below.

DETAILED DESCRIPTION OF EXAMPLE EMBODIMENTS

In the subsequent description of favorable exemplary embodiments of the present invention, identical or similar reference symbols are used for similarly acting elements represented in the various figures, a repeated description of these elements being omitted.

Figure 1:
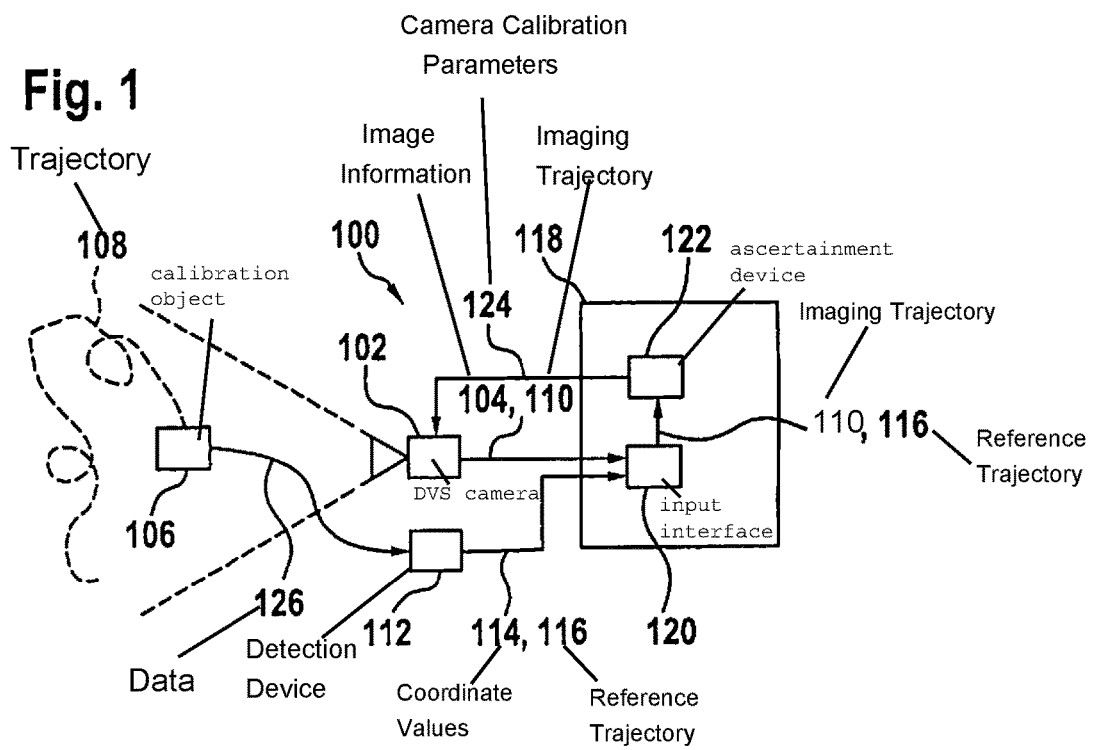
FIG. 1 shows a block diagram of a calibration system for calibrating a camera according to one exemplary embodiment.

FIG. 1 shows a block diagram of a calibration system 100 for calibrating a camera 102 according to one exemplary embodiment. Camera 102 in this case has a dynamic vision sensor, which provides an instantaneous change of intensity values of its pixels as image information 104. As a result, camera 102 detects no comprehensive image of a detecting range of camera 102, but rather changes in the detecting range, in particular movements. When camera 102 is immobile, unchanged or immobile objects in the detecting range are not imaged in image information 104.

A calibration object 106 is moving in the detecting range. Calibration object 106 moves along a trajectory 108. Camera 102 detects the three-dimensional movement of calibration object 106 and images the current movement two-dimensionally in image information 104. Image information 104 detected over a period of time yields a two-dimensional imaging trajectory 110 of calibration object 106 in image coordinates of image information 104.

Calibration system 100 has a detection device 112 for detecting a position of calibration object 106. Calibration object 106 is detected by detection device 112 during its movement along trajectory 108. Detection device 112 represents the current spatial position of calibration object 106 in a three-dimensional coordinate value 114. Coordinate values 114 detected over a period of time yield a three-dimensional reference trajectory 116 of calibration object 106 in world coordinates of detection device 112.

The calibration system furthermore has a device 118 for calibrating camera 102. The imaging trajectory 110 and the reference trajectory 116 are read in via an input interface 120. An ascertainment device 122 ascertains at least one calibration parameter 124 for camera 102 by using imaging trajectory 110 and reference trajectory 116 as well as a calibration rule. It is possible, for example, that the calibration rules was determined one time and stored.

In one exemplary embodiment, calibration object 106 is part of detection device 112. Calibration object 106 in this instance comprises at least one sensor unit and one transmitter unit. The sensor unit detects at least one component of the movement along trajectory 108, and the transmitter unit transmits data 126 to a receiver of detection unit 112. For example, the sensor unit records accelerations acting on the calibration object in acceleration characteristics, which are used to calculate reference trajectory 116.

In other words, a novel calibration approach is presented for calibrating DVS cameras 102.

Research reveals a trend to develop more and more systems and algorithms by imitating nature closely. The approach presented here concerns the calibration of a novel DVS camera 102 (dynamic vision sensor), which is modeled on the manner of functioning of the human eye. This DVS camera 102 will probably gain greatly in importance in the coming years.

For the conversion between image coordinates and world coordinates as well as for the general measurement evaluation of camera data 104, camera calibration parameters 124 are required for DVS cameras 102 as well as for classical cameras, which are able to be determined experimentally. These parameters 124 exhibit manufacturing-related variations. Since the DVS camera 102, however, only transmits differences in individual pixel positions, it is not possible to use calibration methods of classical cameras in this case. In this respect, novel solutions are required in the future. One possible solution is described here.

Classical algorithms for cameras exist in the literature, which allow the camera calibration parameters to be inferred from the knowledge of some lines/points of a known class in the image. For this purpose, it is necessary to place objects of a known height in the scene or to take many photographs manually using a calibration target. The detection of these required points is possible in the case of DVS cameras 102 only with very great effort since it is only possible to measure changes.

The present invention provides a technical device 100, which obtains the measured values 110, 116 required for calibration via a distance measurement between camera 102 and calibration object 106 and synchronized recordings. The calibration process is thereby simplified and, for the DVS camera 102, is thereby first made possible.

For novel sensor technologies such as DVS (dynamic vision sensor), which sense only changes, the described "action-based" calibration process using the corresponding hardware 100 described here makes it possible to perform a calibration, because a still image of the scene cannot be recorded.

Product 100 is on the one hand made up of a communication and synchronization unit mounted on camera 102 or camera unit 112 and, on the other hand, is made up of an elastic ball 106, in which location hardware, for example UWB technology, motion sensors and a communication unit are combined. Ball 106 may be referred to as a calibration ball.

Figure 2:
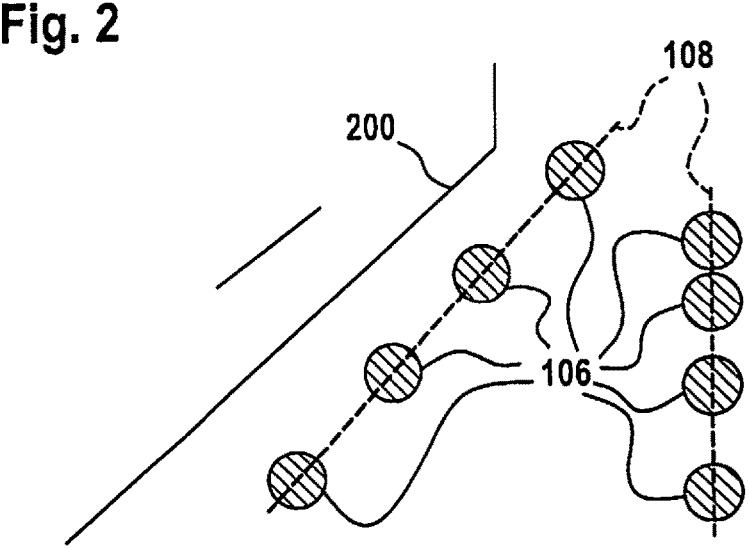
FIG. 2 shows a representation of a trajectory of a calibration object according to one exemplary embodiment.

FIG. 2 shows a representation of a trajectory of a calibration object 106 according to one exemplary embodiment. Calibration object 106 essentially corresponds to the calibration object in FIG. 1. Calibration object 106 is in this case a ball. Calibration object 106 is in this case represented from a perspective of the camera. In other words, FIG. 2 shows a representation of the detecting range of the camera from the viewing angle of the camera.

In one exemplary embodiment, a transition between a floor surface and a wall surface is situated in the detecting range. The transition is represented by an edge 200 Calibration object 106 rolls along a straight-line trajectory 108 on the floor surface.

In one exemplary embodiment, calibration object 106 is represented during an accelerated movement along trajectory 108. Calibration object 106 is shown in free fall, for example. A position of calibration object 106 is represented respectively after uniform time increments. With increasing velocity of the calibration object 106, a distance between the positions increases as well.

In both exemplary embodiments, the position is represented at four different points in time. At these point in time, the detection system respectively detects a position value. At the same time, additionally one fixed image of the camera is recorded in each case. Since calibration object 106 moves, calibration object 106 is represented in the fixed images.

It is possible to calculate the imaging trajectory on the basis of the individual pixel positions of the images in the fixed images. It is possible to calculate the reference trajectory on the basis of the individual position values.

The calibration process functions in such away that when calibration ball 106 is moved through the scene, images and spatial coordinates of ball 106 are synchronously logged relative to the camera. When ball 106 is rolling in the ground plane, measurement data are collected in the ground plane. In the case of free fall, the motion sensors are able automatically to determine the height of fall from the fall time.

At points in time at which a location signal of the calibration ball 106 is received, the camera unit synchronously transmits a trigger signal to the camera. By determining the ball trajectories 108 through Newton's laws and a corresponding balancing calculation of the measured values in camera-relative world coordinates, it is possible then to associate straight lines in the world with straight lines in the image plane, which are generated in the image from the synchronously recorded image series and the segmentation of the calibration ball 106 (CMOS) or the movement pattern (DVS). The balancing calculation also reduces currently existing deficiencies of location hardware such as ultra-wideband, Bluetooth Low Energy, which, however, will diminish with the progressive maturity of the technology. Alternatively, it is also possible to use high-priced location systems such as active infrared markers.

By this measuring process, the same data basis is thus generated as in the calibration methods typically described in the literature. The further calculation occurs analogously.

In other words, FIG. 2 shows superimposed images of a motion image series of a rolling or falling calibration ball 106. The described hardware achieves an accurate allocation of individual images to the relative world coordinates of calibration ball 106.

Figure 3:
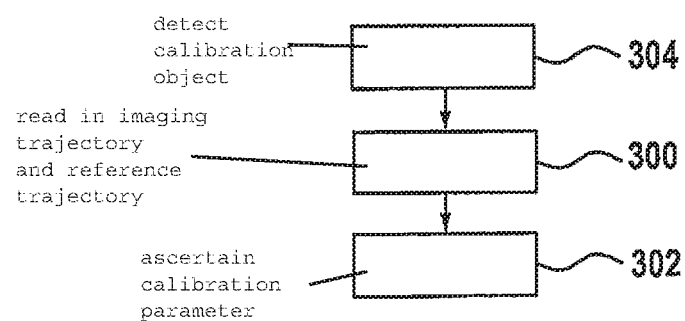
FIG. 3 shows a flow chart of a method for calibrating a camera according to one exemplary embodiment.

FIG. 3 shows a flow chart of a method for calibrating a camera according to one exemplary embodiment. The method may be implemented on a calibration device, as it is shown for example in FIG. 1. The method includes a step 300 of reading in and a step 302 of ascertaining. In step 300 of reading in, an imaging trajectory and a reference trajectory of a moving calibration object are read in. The calibration object is detected by the camera. The imaging trajectory and the reference trajectory represent an actual trajectory of the calibration object. In step 302 of ascertaining, at least one calibration parameter for the camera is ascertained by using the imaging trajectory and the reference trajectory as well as a calibration algorithm.

In one exemplary embodiment, the method includes a step 304 of detecting. In step 304 of detecting, the calibration object is detected and the trajectory of the calibration object is imaged in the reference trajectory.

If an exemplary embodiment comprises and "and/or" linkage between a first feature and a second feature, then this is to be read in such a way that the exemplary embodiment according to one specific embodiment includes both the first feature as well as the second feature and, according to another specific embodiment, includes either only the first feature or only the second feature.

What is claimed is:

1. A method for calibrating a dynamic vision sensor (DVS) camera, the method comprising:
   detecting a two-dimensional imaging trajectory of a moving calibration object by the DVS camera;
   detecting a three-dimensional reference trajectory of the moving calibration object by a detection device that determines the reference trajectory on the basis of a plurality of accelerations of the moving calibration object at a plurality of detection times and corresponding calibration object positions, as measured by an acceleration sensor on the moving calibration object and received by the detection device from a transmitter on the moving calibration object, the imaging trajectory representing a trajectory of the calibration object imaged in image coordinates of the DVS camera and the reference trajectory representing the trajectory in world coordinates;
   reading in the imaging trajectory and the reference trajectory by an interface device that supplies the imaging trajectory and the reference trajectory to an ascertainment device that includes a processing unit; and
   calibrating the DVS camera by the ascertainment device on the basis of the imaging trajectory and the reference trajectory.

2. The method as recited in claim 1, wherein in the reading in step, the imaging trajectory and the reference trajectory are read in to the interface device in a time-synchronized manner.

3. The method as recited in claim 1, wherein the imaging trajectory is determined by using image information of the DVS camera.

4. The method as recited in claim 1, wherein:
prior to the reading in and the detecting steps, a path for the moving calibration object is predefined, and
the detecting steps are carried out as the moving calibration object is moved along the predefined path.

5. The method as recited in claim 1, wherein the moving calibration object is a ball in which are mounted the acceleration sensor and the transmitter, and wherein during each of the detecting steps the moving calibration object is rolled along a straight-line trajectory on a floor surface within a detecting range of the camera.

6. The method as recited in claim 1, wherein the moving calibration object is a ball in which are mounted the acceleration sensor and the transmitter, and wherein during each of the detecting steps the moving calibration object is allowed to free fall within a detecting range of the camera.

7. A calibration device designed to calibrate a dynamic vision sensor (DVS) camera, the calibration device designed to:
detecting a two-dimensional imaging trajectory of a moving calibration object by the DVS camera;
detecting a three-dimensional reference trajectory of the moving calibration object by a detection device that determines the reference trajectory on the basis of a plurality of accelerations of the moving calibration object at a plurality of detection times and corresponding calibration object positions, as measured by an acceleration sensor on the moving calibration object and received by the detection device from a transmitter on the moving calibration object, the imaging trajectory representing a trajectory of the calibration object imaged in image coordinates of the DVS camera and the reference trajectory representing the trajectory in world coordinates;
read in the imaging trajectory and the reference trajectory by an interface device that supplies the imaging trajectory and the reference trajectory to an ascertainment device that includes a processing unit; and
calibrate the DVS camera by the ascertainment device on the basis of the imaging trajectory and the reference trajectory.

8. A calibration system for calibrating a dynamic vision sensor (DVS) camera, the calibration system comprising:
a moving calibration object; and
calibration device designed to calibrate the DVS camera, the calibration device designed to:
detecting a two-dimensional imaging trajectory of the moving calibration object by the DVS camera;
detecting a three-dimensional reference trajectory of the moving calibration object by a detection device that determines the reference trajectory on the basis of a plurality of accelerations of the moving calibration object at a plurality of detection times and corresponding calibration object positions, as measured by an acceleration sensor on the moving calibration object and received by the detection device from a transmitter on the moving calibration object, the imaging trajectory representing a trajectory of the calibration object imaged in image coordinates of the DVS camera and the reference trajectory representing the trajectory in world coordinates;
read in the imaging trajectory and the reference trajectory by an interface device that supplies the imaging trajectory and the reference trajectory to an ascertainment device that includes a processing unit; and
calibrate the DVS camera by the ascertainment device on the basis of the imaging trajectory and the reference trajectory.

9. The calibration system as recited in claim 8, wherein the moving calibration object is a ball in which are mounted the acceleration sensor and the transmitter.

10. A non-transitory machine-readable storage medium on which is stored a computer program for calibrating a dynamic vision sensor (DVS) camera, the computer program, when executed by a processing unit, causing the processing unit to perform:
detecting a two-dimensional imaging trajectory of a moving calibration object by the DVS camera;
detecting a three-dimensional reference trajectory of the moving calibration object by a detection device that determines the reference trajectory on the basis of a plurality of accelerations of the moving calibration object at a plurality of detection times and corresponding calibration object positions, as measured by an acceleration sensor on the moving calibration object and received by the detection device from a transmitter on the moving calibration object, the imaging trajectory representing a trajectory of the calibration object imaged in image coordinates of the DVS camera and the reference trajectory representing the trajectory in world coordinates;
reading in the imaging trajectory and the reference trajectory by an interface device that supplies the imaging trajectory and the reference trajectory to an ascertainment device that includes a processing unit; and
calibrating the DVS camera by the ascertainment device on the basis of the imaging trajectory and the reference trajectory.

\* \* \* \* \*